US012790052B2

(12) United States Patent
Sornikov

(10) Patent No.: US 12,790,052 B2
(45) Date of Patent: Nov. 10, 2026

(54) PROGRAMMABLE ROTARY VACUUM PACKING MACHINE

(71) Applicant: Amcor Flexibles North America, Inc., Neenah, WI (US)

(72) Inventor: Aleksandr Yakovlevich Sornikov, Aukland (NZ)

(73) Assignee: AMCOR FLEXIBLES NORTH AMERICA, INC., Neenah, WI (US)

( * ) Notice: Subject to any disclaimer, the term of this patent is extended or adjusted under 35 U.S.C. 154(b) by 0 days.

(21) Appl. No.: 18/714,664

(22) PCT Filed: Dec. 13, 2022

(86) PCT No.: PCT/NZ2022/050166

§ 371 (c)(1),
(2) Date: May 30, 2024

(87) PCT Pub. No.: WO2023/113619

PCT Pub. Date: Jun. 22, 2023

(65) Prior Publication Data

US 2025/0026519 A1 Jan. 23, 2025

(30) Foreign Application Priority Data

Dec. 13, 2021 (NZ) ........................................ 783434

(51) Int. Cl.
*B65B 31/02* (2006.01)
*B65B 51/10* (2006.01)
(Continued)

(52) U.S. Cl.
CPC ............ *B65B 31/022* (2013.01); *B65B 51/10* (2013.01); *B65B 59/003* (2019.05); *B65B 59/02* (2013.01);
(Continued)

(58) Field of Classification Search
CPC ..... B65B 31/022; B65B 59/003; B65B 51/10; B65B 59/02; G05B 19/042; G01M 3/32;
(Continued)

(56) References Cited

U.S. PATENT DOCUMENTS 2,630,955 A 3/1953 Moses et al.
4,550,548 A 11/1985 Owensby et al.
(Continued)

FOREIGN PATENT DOCUMENTS

JP 54131491 A 10/1979
WO 2007004900 A1 1/2007

*Primary Examiner* — Veronica Martin
(74) *Attorney, Agent, or Firm* — Greg N. Geiser

(57) ABSTRACT

A programmable rotary vacuum packing machine uses an array of shells on a rotating turntable as temporary vacuum chambers, for sealing each bag. Each shell has three groups of bidirectional pneumatic actuators. A computer controls separately addressable pneumatic valves upon the rotating turntable to determine some timings of the sequential vacuum packing process within each shell. Timing and intensity of heat sealing after application of pressure is also controlled. During operation, the machine accepts real-time process modifications according to bag type or contents characteristic so that any particular bag, as identified upstream or by the operator, receives a customized process.

10 Claims, 5 Drawing Sheets

Figure 1:
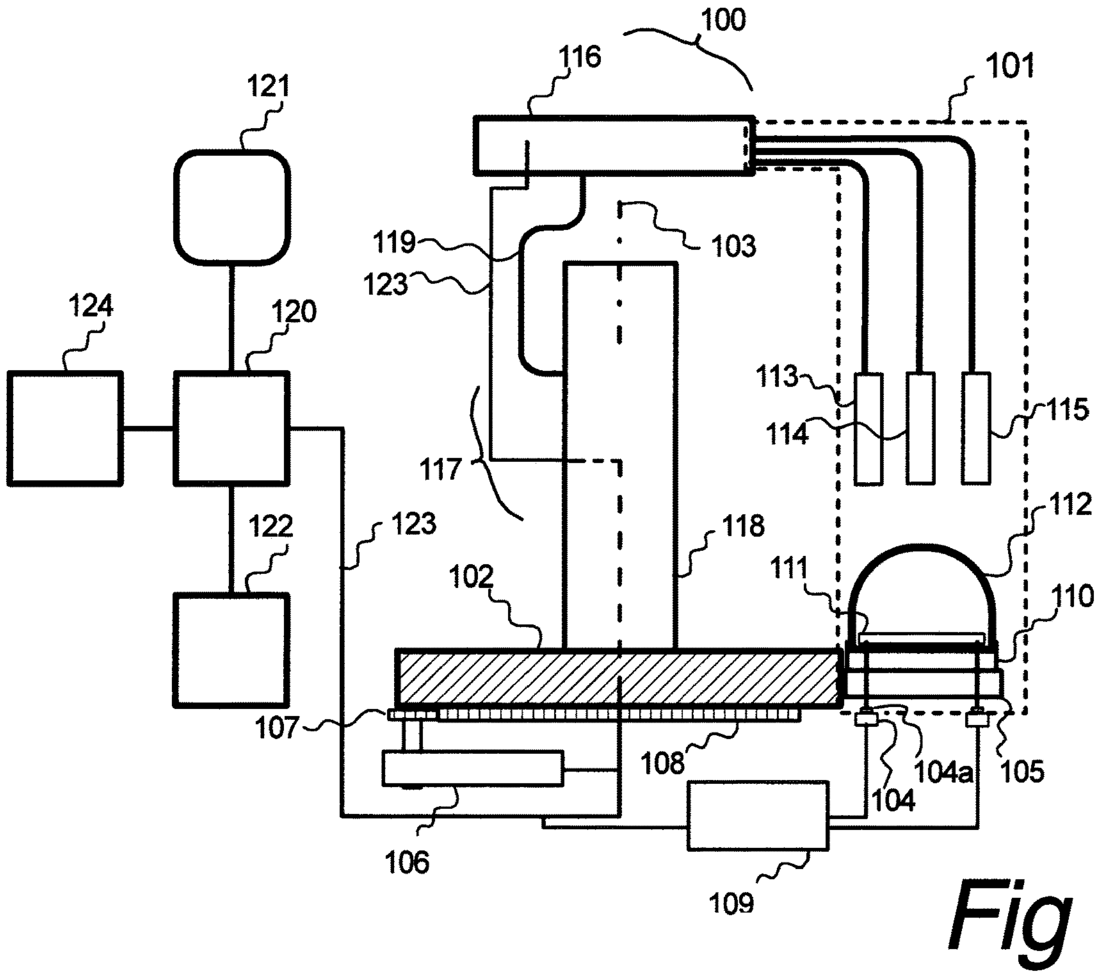

(51) Int. Cl.
*B65B 59/00* (2006.01)
*B65B 59/02* (2006.01)
*G05B 19/042* (2006.01)

(52) U.S. Cl.
CPC .. *G05B 19/042* (2013.01); *G05B 2219/25312* (2013.01)

(58) Field of Classification Search
CPC .. H02G 7/02; H02G 7/04; H02G 1/02; H02G 1/04
See application file for complete search history.

(56) References Cited

U.S. PATENT DOCUMENTS

| | | | |
|---|---|---|---|
| 4,586,320 A | 5/1986 | Takai et al. | |
| 4,754,596 A | 7/1988 | Yasumune et al. | |
| 10,941,879 B2 | 3/2021 | McDonald et al. | |
| 2006/0156691 A1* | 7/2006 | Yokota | B65B 9/207 53/551 |
| 2021/0164586 A1* | 6/2021 | McDonald | B29C 66/232 |
| 2021/0394945 A1* | 12/2021 | Soci | B29C 66/4312 |

* cited by examiner

Fig 7
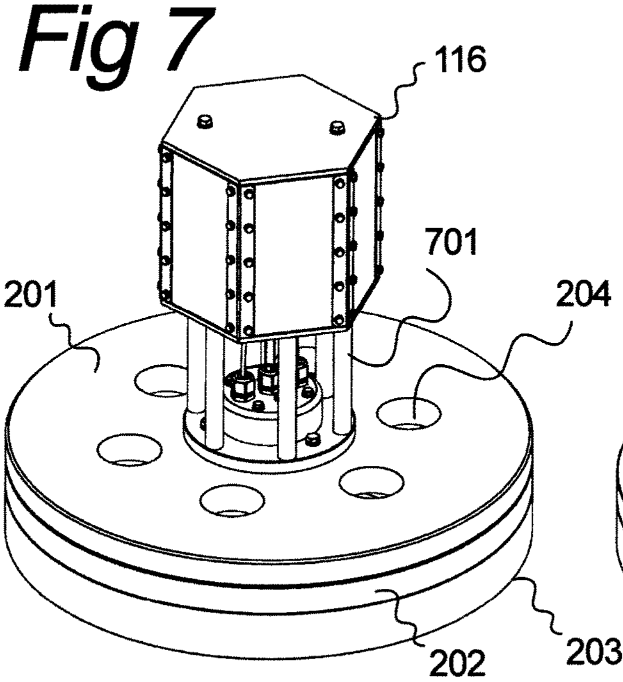
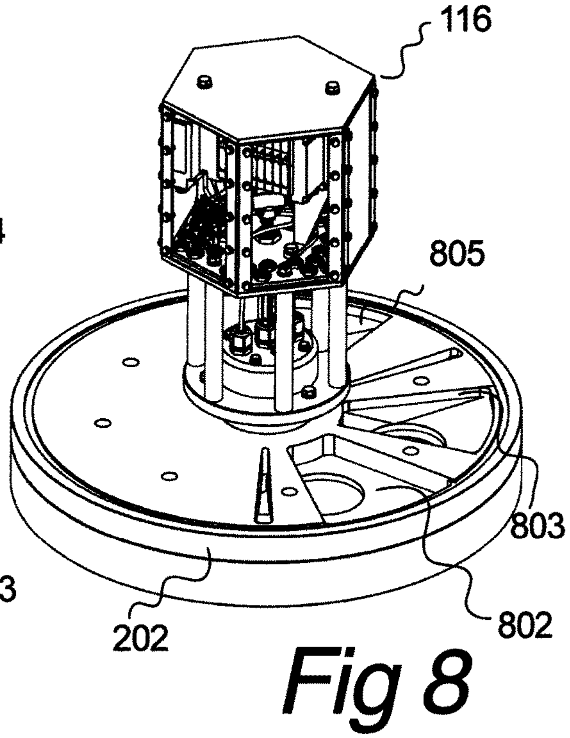
Fig 8
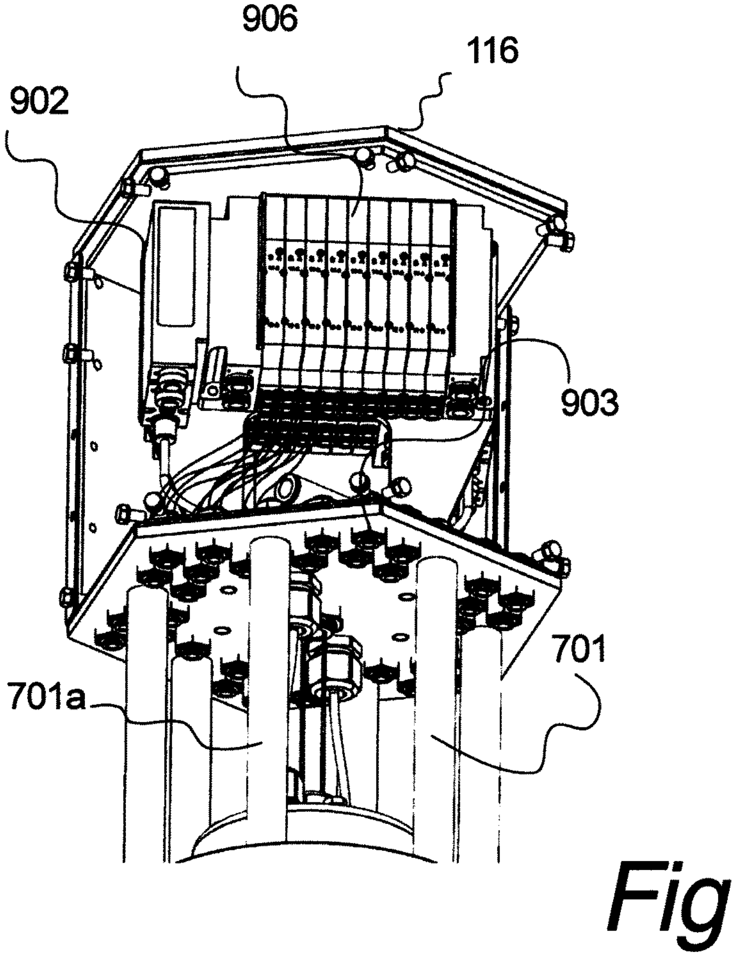
Fig 9

PROGRAMMABLE ROTARY VACUUM PACKING MACHINE

FIELD

The invention relates to a machine of the type known as a "Rotary Vacuum Packing Machine" which is used industrially to pack a sequence of foodstuffs, such as but not limited to cuts of meat, after removal of substantially all gas inside a sealed bags comprised of a gas-impermeable thermoplastics material. Bagged but as yet unsealed items are presented inside thermoplastics bags to shells at a radial array of working sites about a periphery of a turntable, inside each of which a process including evacuation and sealing each bag is performed in a serial manner.

Definitions

"Turntable" refers to the main rotatable disk of the machine, which transports carriers around the sites where a sequence of actions is done.

"Chamber" refers to the temporary and gas-tight combination of a shell supported from the turntable when in contact with a carrier base or platen supported on a conveyor, while traversing the turntable.

"Programmable" is a term used to describe the present Rotary Vacuum Packing Machine that is able to accept instructions that vary the parameters used for performing a packing task from those used by default. In particular, the instructions may be revised from bag to bag during operation and cause the machine to vary the start and duration of processing steps.

"Vacuum" refers to a gas having a pressure of less than 20 mbar.

The term "including" as used herein refers to an open list for which other members may exist, as distinct from the term "comprising" which refers to a complete, closed list.

BACKGROUND OF THE INVENTION

Prior-art rotary vacuum packing machines process the contents of each shell as it turns around a turntable in the same sequence but at different start times, like a round or perpetual canon in music. Timing of process steps is predetermined by fixed apparatus such as by a set of cams that are tracked by cam followers under each shell, or by segmented slip rings while the machine rotates at a steady rate. Examples are:

U.S. Pat. No. 2,630,955 (filed 1950) describes a four-station (shell) rotary vacuum sealing machine.

U.S. Pat. No. 10,941,879 to Cryovac LLC describes a 7-shell rotary vacuum packing machine in which an infeed conveyor delivers unsealed bags to, and an outfeed conveyor receives sealed bags from, a turntable. An ingenious automated loading and unloading apparatus conserves floor area. The carriers remain on the turntable itself. '879 has pneumatic, controlled valves to operate actuators. Valves are activated with solenoid power passed through a physical selection mechanism: a complex slip ring assembly analogous to a rotary switch having 7 positions, one for each shell and about 5 banks as shown in FIGS. 18 and 19. Each bank corresponds to one function such as driving a perforating knife. The non-rotating computer apparatus uses appropriate drivers to send solenoid operating power across the rotating connection to control a pneumatic valve on a selected bank while the corresponding position—as a 51 degree sector (64) for the 7-shell version—is in contact.

Problem to be Solved

For an extended shelf-life, it is desirable to store meat or other perishable food items in a relatively high vacuum, such as 1 mbar, inside a sealed bag. Present-day machines typically create vacuums more like 25-30 mbar.

One goal is to leave more time for evacuation of each bag if the vacuum packing machine is running at a fixed conveyor speed; alternatively to work at a faster conveyor speed. The total available processing time per shell is typically about 3 to 4 seconds.

It may be desirable to provide customized parameters for each bag, since each bag with its unsealed contents may differ and therefore may have differing requirements.

Disadvantages of the prior art include an inability to easily alter timing of the sequential process steps because the timing of actions that initiate and terminate the steps are set by mechanical components such as cams with cam followers. Some timing components may be changed only if the machine is first stopped and then reconfigured in order to better suit a run of a different product. Down time is expensive and inconvenient. It is particularly infeasible to change settings between one bag and the next, even though a sequence of bags may each hold differing contents.

SUMMARY OF THE INVENTION

In a first broad aspect, the invention provides a rotary vacuum packing machine (herein abbreviated as "machine") having a first number of vertically openable and closable shells disposed as a radial array upon a rotatable turntable having a hub that rotates, when in use, about an axle; each shell is capable of forming a sealed chamber for evacuation and sealing purposes when lowered onto one of a second number of article carriers each mounted on a conveyor and carried around the turntable while holding an unsealed, bagged article in a thermoplastics bag for vacuum packing; each shell including groups of one or more actuators; each group having a function selected from a range including holding, perforating, cutting and sealing functions; wherein each group of actuators is controlled by separately addressable, electrically operated pneumatic valves mounted upon the rotatable hub and addressed through a communications network by a digital computer or a functional equivalent thereof (herein referred to as 'computer') so that, when in use, each shell can independently be caused to carry out at least some steps of a sealing procedure at individually selected times.

Preferably the digital computer is programmed in order to serve as a dedicated processor and would be purchased as a functional part of the machine.

Preferably, the turntable is provided adjacent the hub with apparatus for providing a continuous, rotatable connection between a fixed axis and the rotatable hub of the turntable to electrical energy and to the communications network; the apparatus being selected from a range including continuous slip rings and a rotary transformer.

Preferably, the machine also includes an indexing transducer at a network address and responsive to an article carrier in proximity.

Preferably, the groups of actuators are bidirectional; the actuator or actuators of each group being connected through a flexible pipe to an addressed valve capable in use of supplying compressed air at an extension connector or at a retraction connector to a selected pneumatic valve.

In an associated aspect the turntable is provided with a rotatable joint adjacent the hub for carrying compressed gas to the valves.

In a further associated aspect connection between any one shell and a vacuum pump is established through a sliding joint system connected to a pipe terminating at a side of the shell.

Preferably, a first set of actuators is used to advance and retract a piercing blade.

Preferably a second set of actuators is used to advance and retract a cutoff blade.

Preferably a third set of actuators is used to forcibly advance an upper scaling bar against a corresponding surface of a lower sealing bar of the carrier before and during heating in order to melt the thermoplastics material between the bars and create a sealed or fused strip across the bag.

Preferably, a resistive heater in a sealing bar within each article carrier is heated with a controlled current collected by conductive brushes from fixed electrical conductor rails disposed in a zone below the turntable, wherein the computer controls the timing and an amount of current in the rails according to the type of thermoplastics material to be fused.

In a second major aspect, the computer controls each step of a vacuum packing process in accordance with the characteristics of each package to be sealed.

Preferably, the computer employs at least one stored table of timing information; each table comprising values previously established as suitable for evacuating and sealing a bag including a thermoplastics film and taking account of the contents of the bag, the size of the bag, the required temperature for fusing the bag to be sealed, and the speed of the conveyor.

Preferably, the computer, when in use, is capable of receiving all descriptive inputs about each incoming item to be packed, originating from a range including without limit a human operator, a computer network, an upstream process, a machine-vision system at an in-feed location, and a reader capable of reading indicia previously printed on to each bag, and the computer may amend a copy of the stored table appropriate for the particular operating conditions and apply the amended information to the valves connected with an identified shell.

Optionally, one computer manages more than one rotary vacuum packing machine through a shared communications network.

Preferably, the computer also displays data about the or each process to an operator at an operator console interface, and is responsive to operator commands intended to change at least one process parameter, thereby allowing amendment while the machine is in uninterrupted operation.

Preferably, each turntable hub carries related electrical equipment includes network-compatible address decoding circuits, solenoid driver circuits, and a local power supply or conditioner.

Optionally the computer is adapted to interpret at least one parameter to be changed, taking account of interactions with other vacuum packing parameters Preferably each addressable electrically controlled valve is connected to a shared digital network and is arranged to respond to a command sent to the valve address within the network by the computer, thereby providing the computer with a capacity for steps of each vacuum packing operation taking place under any of the shells opening and closing of each of said groups of actuators connected to any one shell.

THE DRAWINGS

FIG. 1: A schematic diagram of aspects of this Programmable Rotary Vacuum Packing Machine.

Figure 2:
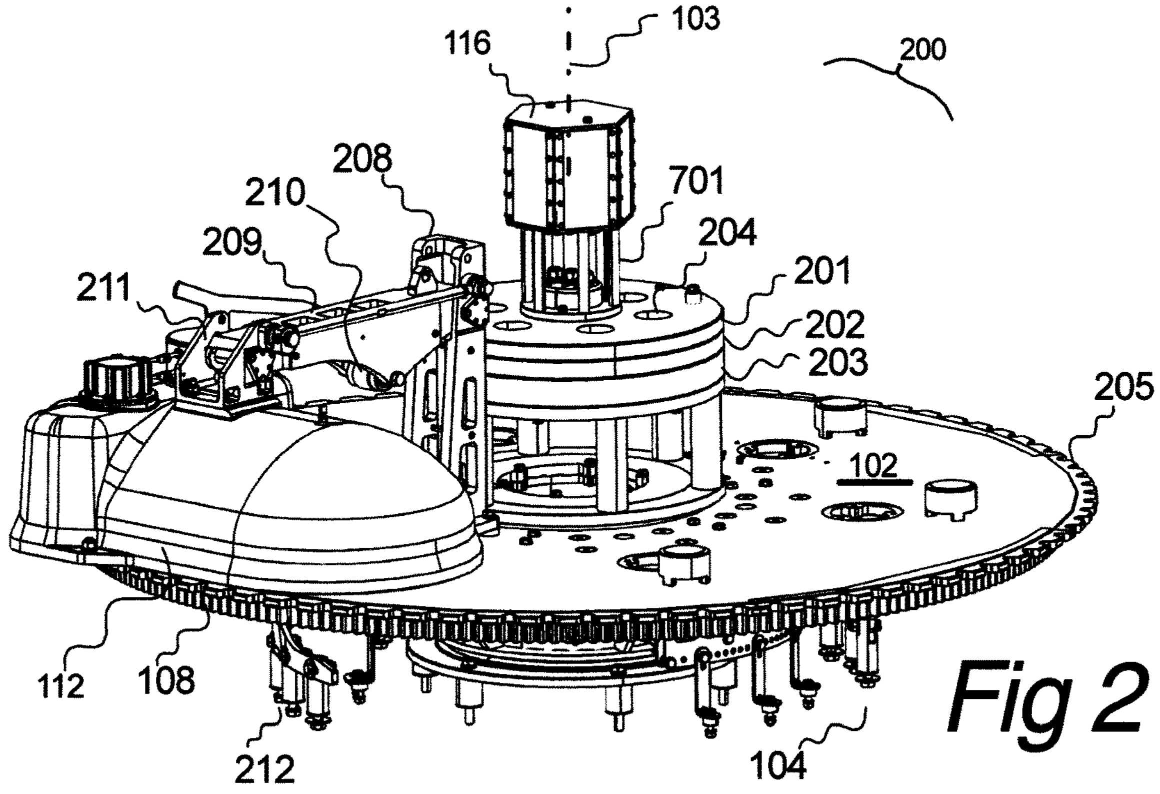

FIG. 2. An oblique drawing of part of the turntable.

Figure 3:
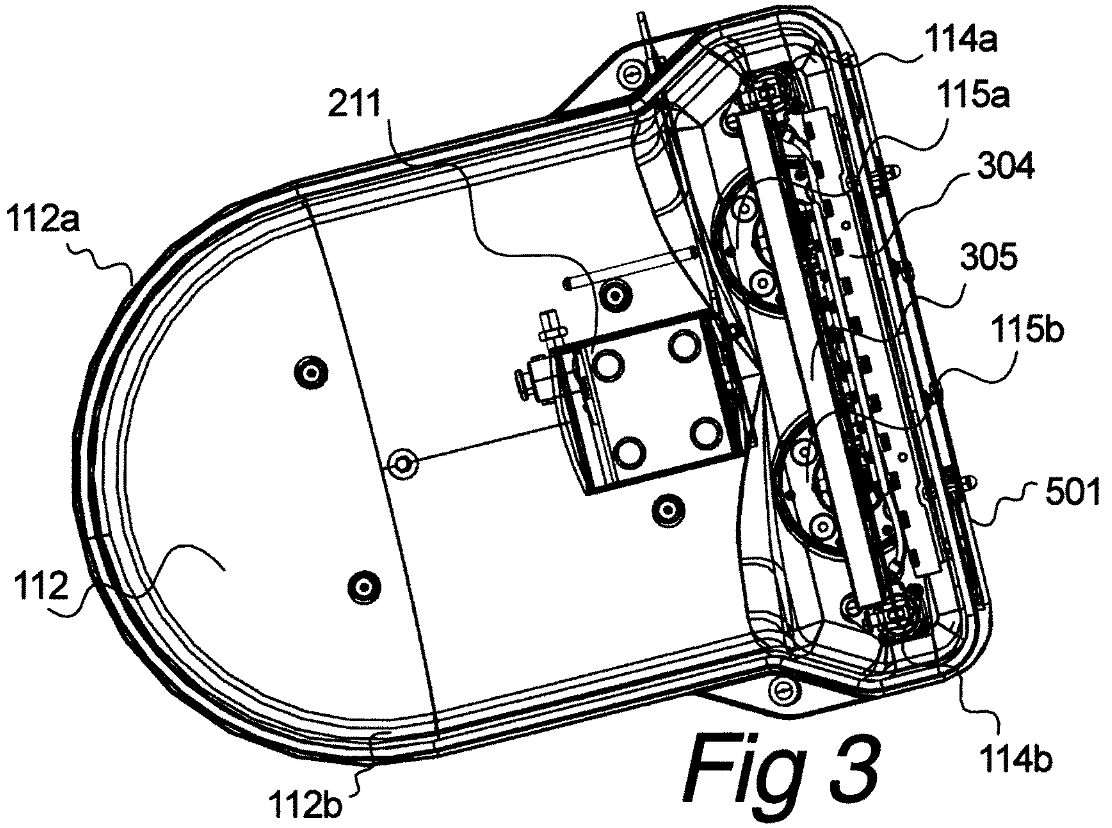

FIG. 3: An underneath view of one shell.

Figure 4:
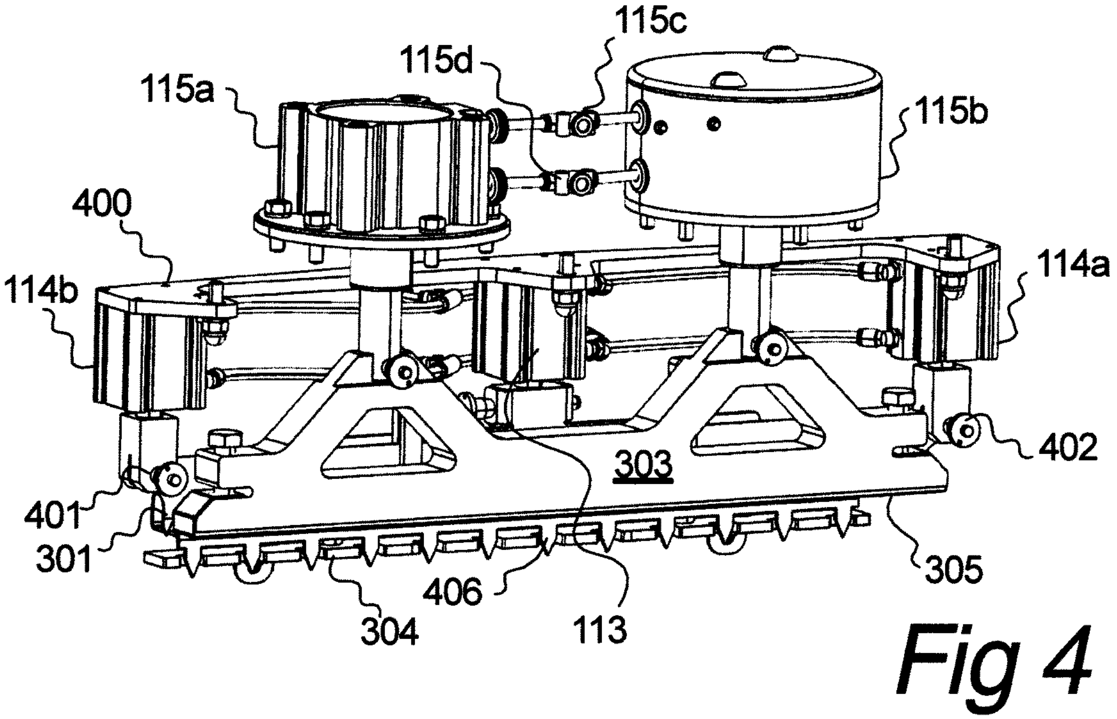

FIG. 4: An oblique front-side view of one shell.

Figure 5:
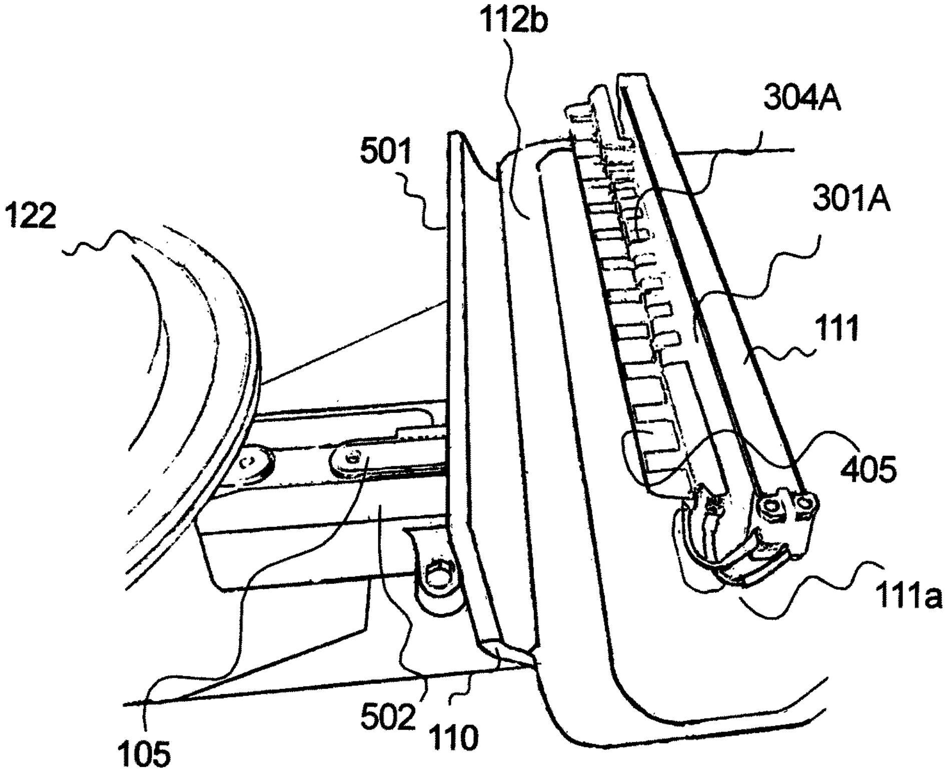

FIG. 5: A slanted view of the carrier showing equipment around the lower heatable sealing bar.

Figure 6:
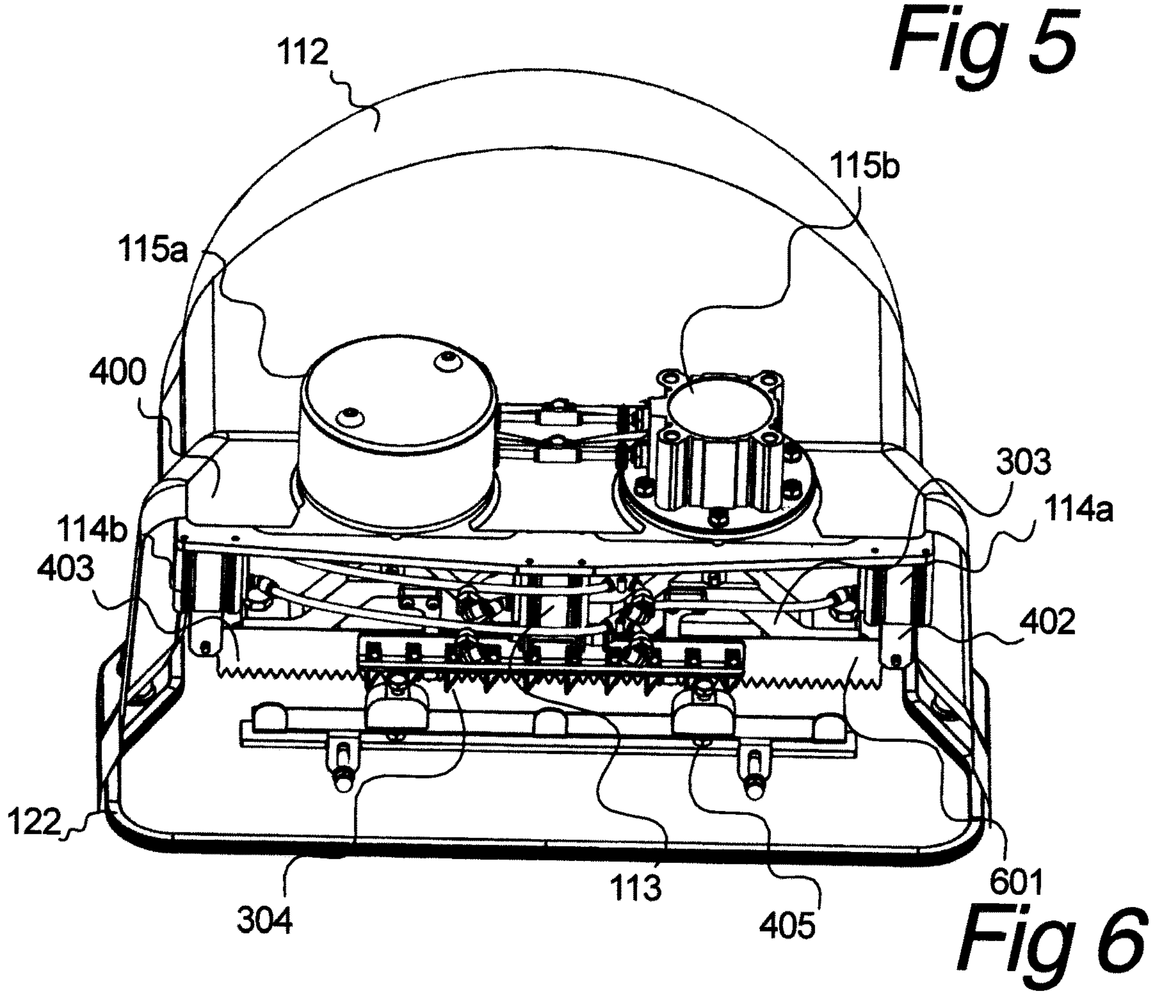

FIG. 6: An oblique view of the leading end of the shell.

FIG. 7: Surface view of the vacuum valve, the housing for the air valves, and the support posts.

FIG. 8: The interior of the vacuum valve.

FIG. 9: Detail of the interior of the housing 116.

Figure 10:
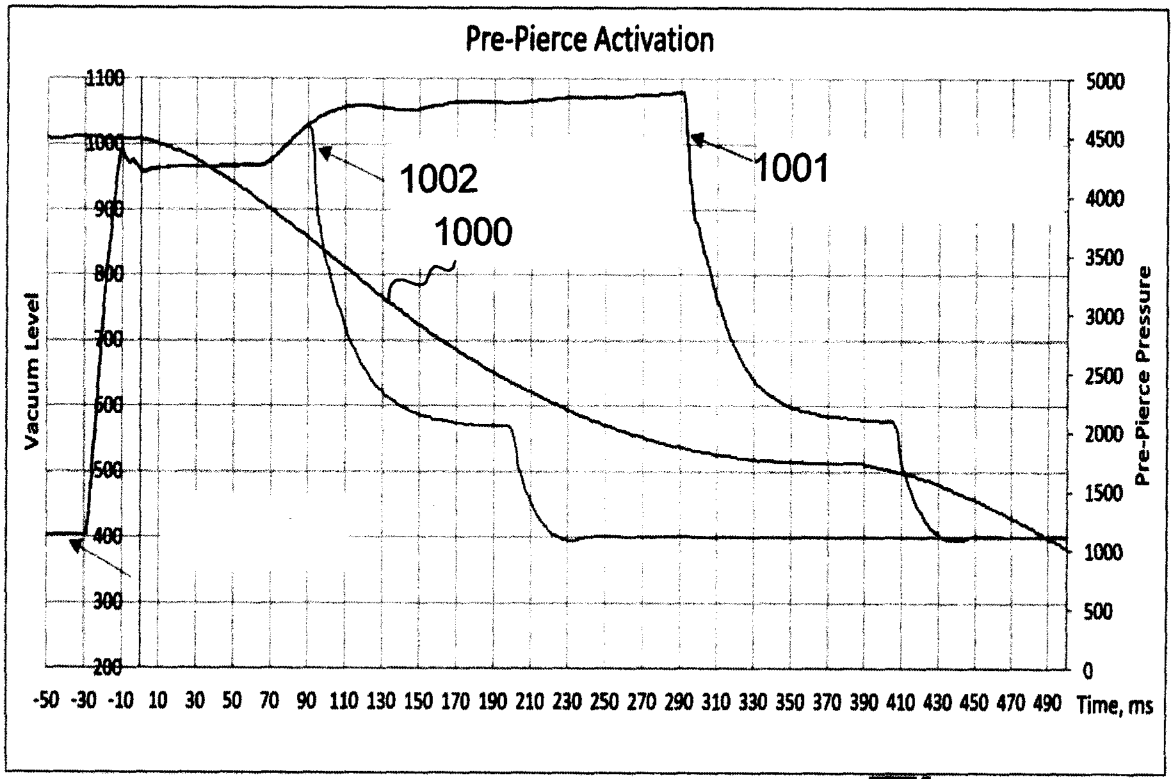

FIG. 10. Graph comparing cam-based and electric timing of pre-pierce actuator activation.

Figure 11:
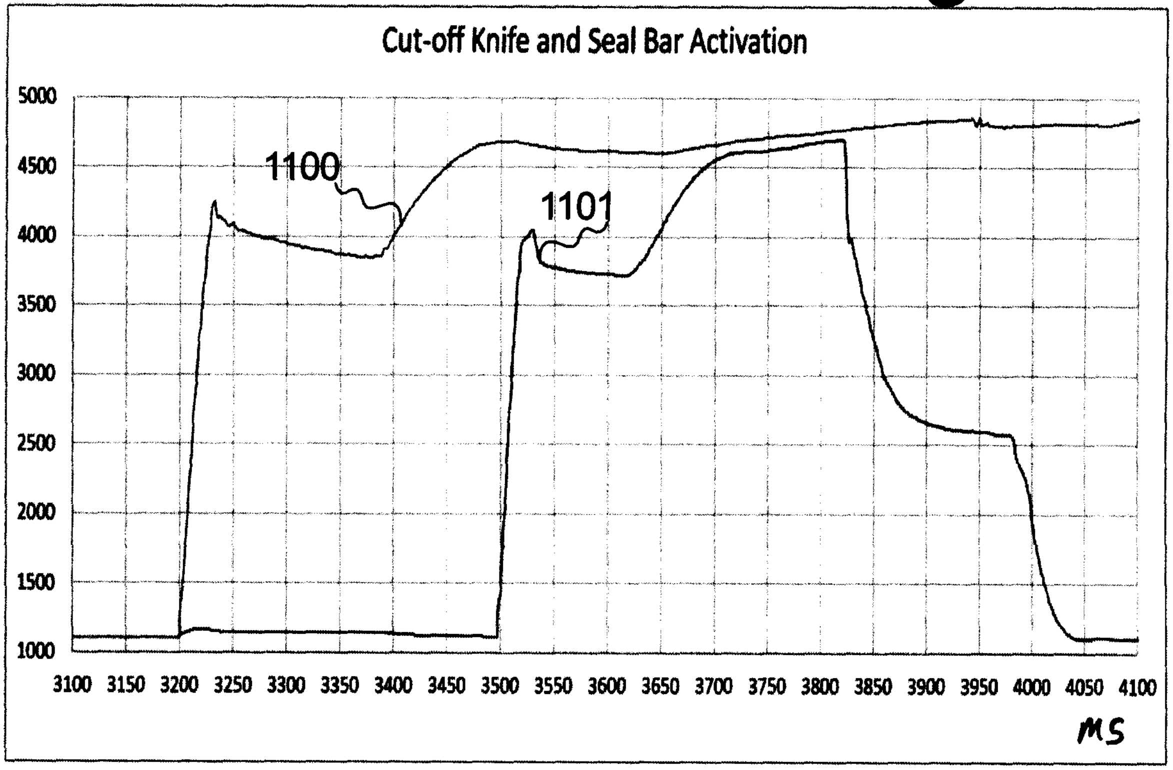

FIG. 11. Graph showing cutoff knife and seal bar activation.

DETAILED DESCRIPTION OF THE INVENTION

The embodiment of a programmable rotary vacuum packing machine evacuates each pre-loaded bag before sealing it. Some steps may be optimized by computer command in real time—on a bag-by-bag basis.

See FIGS. 1 and 2. FIG. 1 is a schematic diagram of aspects of a particular prototype 100 of the machine. (The vacuum line, and the compressed air line, typically 4.5 bar, are not shown). The turntable 102 and the hub 118 rotate about axis 103, and carry an array capable of decoding individual addresses from a connected digital network and then of operating the corresponding pneumatic valve solenoid drivers 116 accordingly. The parts inside dashed line 101 are replicated for each workstation; including shell 112 and actuators on or inside the shell, 113, 114 and 115.

For control of the sealing process, the invention preferably uses bidirectional or double-action pneumatic actuators having a powered advance stroke and a powered return stroke. The actuators are connected by flexible gas lines 101 between housing 116 with the corresponding shell 112. Each electrically driven valve inside housing 116 supplies air to either side of a related actuator (or group) when commanded by dedicated computer 120 acting through the PLC pneumatic valve controller inside housing 116, shown in FIGS. 7, 8 and 9. Actuators are disposed singly or in pairs as actuator groups 113, 114 and 115 about the shell as illustrated in, for example, FIG. 6. Note that in FIG. 6 the cover has been removed from one actuator, 115*b*. Actuators may include sensors to confirm that the piston has moved; useful for better control.

In this embodiment, compressed air for the actuators reach the rotating PLC pneumatic valve controller through sliding valves at the hub. Connections to a vacuum pump are made through sliding valves after each chamber has been formed by closure between a shell and an underlying carrier. A non-collapsible flexible pipe carries air from a connector 601 at the trailing end of each shell as shown in FIGS. 7, 8 and 9 to the vacuum pump during evacuation.

The group including the digital computer 120 with related devices 121 (console), 122 (memory) and 124 (bag data interface), the motor 106, a lifting cam underneath the disk sprocket for causing the shells to lift and lower, the supply of vacuum, and the heater supply contact rails 104 are all fixed to the workplace floor and do not rotate, but the shells, the hub and housing 116 and the sets of actuators 113-115 inside the shells rotate continuously, when in use, about the hub 118.

Accordingly devices serving as stationary-to-rotating electrical connections, such as a rotary transformer or a set of continuous slip rings are used to transfer electric power (119) for operating the addressable valves, and control signals (123) from and to the computer 120 across a rotating joint to the main hub 118. Control signals may be exchanged by equipment known from networks of types widely used in the computer industry, such as "the wired Ethernet family", radio links such as "WiFi", optical links, or "Ethernet over power" devices. The last type allows communication through the axially placed rotary transformer or a two-ring slip ring apparatus used to provide power to the pneumatic valves The computer transfers control information for activating or deactivating each group of actuators in the form of preferably a unique address for each pneumatic valve within each machine. The computer is tasked to know exactly which actuator is required to be activated at any moment of a laid-down sequence during rotation of the turntable, given a starting time for arrival of any one bag in its carrier and characteristics of each bag and contents to be sealed. An absolute encoder, located on the disk sprocket, passes a sensor and starts the sequence. Some characteristics are established upstream of the apparatus for each bag in a range including human input, bag scanning, label reading, or RFID tag reading, and the computer 120 is empowered to apply suitable timing for each process of each bag. Normally the rate of rotation of the turntable remains unaltered. Specific bag characteristics if supplied would most likely modify a "basic set" in memory. By receiving and acting on immediate commands, the rotary vacuum packing machine becomes programmable and has a high degree of functionality.

The housing 116 which rotates with the disk sprocket holds (a) the solenoid-driven air valves; from which typically 36 flexible pipes (not shown) pass compressed air at 4-6 bar to the actuator groups in all the shells and related components on the turntable. The rotating housing 116 contains an array of solenoid drive valves 906 and a microprocessor or microcontroller (within 902) serving as an address decoder connected to a network including computer 120. FIGS. 7, 8 and 9 show the housing 116 physically located above the hub of the turntable. The embodiment described uses SMC Pneumatics.com type "SS5Y3-10SEAN-09B-C6" Pneumatic Manifold" or equivalent, as Programmable Logic Controllers. The main computer 120 is currently 5069-L320ERM CompactLogix 5380 (Allen-Bradley; Rockwell Automation). These items are inherently adapted for industrial use.

If a recognizable address and "activate" or "deactivate" command combination is received, the solenoid valve having that address is commanded to operate. There are three solenoid valves 906 for the three groups of actuators in each shell; eighteen for the six-shell embodiment described. Bidirectional actuators are preferred, rather than a type that is extended only while receiving air. If grouped, actuators in any one shell are connected in parallel. Block 902 receives (typically) 24 volt AC power on line 119 and provides DC power for itself and other modules including the solenoid drivers driven by the microcontroller and associated with the bank of two-way pneumatic valves which are in an array 906 inside the rotating housing 116 as shown in FIG. 9. Compressed air to the hub apparatus is passed through sliding valves, then is forwarded under computer control to the actuator groups in a specified shell. Each shell also receives six flexible air pipes to the three bidirectional pneumatic actuator groups indicated as solid lines inside 101 in FIG. 1. FIG. 9 shows the six air pipe fittings or outlets for one shell located between the two posts 701 and 701*a*.

One may use a single digital computer 120 in charge of several separate rotary vacuum packing machines, since banks of for example three adjacent machines are used in simultaneous operation in an industrial installation and it is probably best to have a single operator console. Network signals preferably using EtherNet/IP protocols may be carried through the continuous slip ring assembly or alternatives. If a recognizable address and "activate" or "deactivate" command combination is received, the solenoid valve having that address is immediately provided with operating power and opens or closes in about 10 ms. The signals/data bus 123 represents a network. It is likely that the number of separately addressable nodes on a three-machine network will approach 255 yet remaining well within capacity of the address space of an Ethernet/IP network. The preferred network is bidirectional. An example of an address is given below. A benefit of employing a digital network to exchange data between a computer and addressed devices inside the rotating assembly is that in order to overcome potential noise in any signal, error detection algorithms may be used and if necessary, the message is repeated until the address of a packet is clear. Noise may, for example, arise at brush contacts or during wireless transmission. The address decoder is effective at any position of the turntable since the slip rings are continuous.

The hub 118 supports a slip ring assembly 117 to provide continuous electrical connections between rotating parts carried on the disk sprocket and corresponding fixed supplies. A preferred slip ring assembly as used in this embodiment is the product EH1256-10FS-53052 from Senring Electronics Co., Limited of No. 1, Dahua Road, Yanchuan, Songgang, Bao'an, Shenzhen 518105, Guangdong, China. This product includes connections rated for carrying solenoid and processor operating power at a suitable current; also for carrying gigabit Ethernet signals, and is rated for millions of revolutions.

The parts inside dashed line 101 of FIG. 1 are replicated for each of typically 8 workstations; including shell 112 and actuators or groups actually inside the shell, 113, 114 and 115. The actuators are connected to the controller by flexible gas lines 101.

FIG. 2 is a perspective drawing of part of one embodiment 200 of the machine, showing only one shell 112. The turntable is the large disk 102 surrounding a hub having a vertically directed central axis of rotation indicated as the dot-dash line 103. The turntable rotates upon conventional thrust and radial bearings while supported on the machine base (not shown). The turntable 102 is concentrically attached to a large pinion wheel 108 driven by a motor and reduction gearbox 106 through a meshed spur gear 107 at a controllable rotation speed which may be 3 to 10 revolutions·min$^{-1}$. The signals/data bus 123 from the computer 120 includes a branch to control the motor and optionally carry motor speed sense signals, proportional to conveyor speed, back to the computer. The teeth 205 of the disk sprocket 108 which shifts the partially encircling horizontally driven conveyor 105, and the teeth of the pinion wheel 108 may conveniently comprise a contiguous radial array of bolted-on sectors. Continuous conveyor 105 can flex from side to side of a straight line and takes attached carriers 110 into and out of the rotary machine. Each carrier 110 brings an unsealed bag containing an item intended for sealing under vacuum to the machine, after being loaded at an in-feed site which may be an upstream process or a conveyor transfer. An accompanying set of data describing the bag with its contents may be supplied or created. Each carrier 110 becomes the base of a closed chamber during the sealing process. Each shell is a work station where a set of operations are sequentially carried out on a bag, including sealing under vacuum. Carriers are spaced along the conveyor so that that each one becomes aligned with a shell 112, part of the rotating hub for sealing as a vacuum chamber to occur when the conveyor engages with the sprocket teeth 205. After sealing, the same conveyor will take the bag to an out-feed site for appropriate storage and distribution.

Each carrier includes a base or platen having a scalable perimeter 112*b* (part shown in FIG. 5) which makes sealing contact with the rim 112*a* of the shell 112.

In FIG. 2 one out of typically six shells is shown as a concave rigid shape 112. It is supported from the disk sprocket of the machine upon a mechanical lifting and lowering bracket 211 at an end of a strut 209, pivotally supported from a raised trunnion 208. The bracket is used to lift or lower the shell, dictated by a push or drop action of a rod supported by a cam follower (not shown; underneath the disk sprocket) against bearing 210. A fixed arc-shaped cam (212) having a shaped upper edge on which the cam follower rides determines the sector around the disk sprocket where the shell shall be lowered and later lifted. It is appreciated that some parts of the invention as described in this embodiment remain mechanically limited, while others are under computer control. When the shell is lowered on to the carrier at rim 112*b*, a seal forms against a gasket on rim 112*a* at the periphery of the shell, allowing gases inside the chamber comprised of base 110 and shell 112, and from inside the bag holding the product to be evacuated through aperture 601. In this embodiment, a set of sliding rotary vacuum valves are placed so as to evacuate each chamber after the chamber has been closed.

The front of the shell 112 (direction of travel), or the 'leading end' moves toward the right of FIG. 2 and the disk sprocket rotates in an anticlockwise direction. The conveyor bearing the bases for the shells is not shown. The housing 116 which rotates with the disk sprocket supports the PLC modules for power conditioning, receiving network addresses, and driving specified pneumatic valves accordingly.

A single actuator 113 is connected to a pierce blade 406 having a plurality of perforating points. Extension of actuator 113 causes a row of holes to be perforated by a spiked knife 304 through the bag inward of the clamped zone at clamp plate 405, and outward of the intended sealing zone adjacent the sealing bars. The spikes pass through apertures in a plate 304A (FIG. 5). The holes allow release of air from inside the clamped bag when the vacuum is applied. After sealing by fusion between the two heater bars, the paired actuators 114*a* and 114*b*, also located inside the shell as shown in FIGS. 3 to 6 extend each end of a cutoff blade 301 which trims the perforated portion of each bag off the sealed portion just beyond the sealing bars along the side face 301A of the fixed, lower heater bar. The pivotal connection 401, 402 of each actuator to the mostly obscured cutoff blade 301 is visible in FIG. 4.

FIG. 5 also shows a part of the conveyor bearing the carriers, as pivotally mounted strips 105. At this place, they slide inside a guide 502 of a durable plastics. A portion of the next carrier bearing a bag to be processed is shown at the left.

One aspect of the present invention is that it allows the duration of exposure of the interior of any bag to the vacuum to be maximized within the limits set by turntable speed. An external vacuum pump is continuously operated. 204 indicates one large-diameter vacuum port, on a rotating disk 201 (see also FIG. 7) which makes a sealed sliding connection with vacuum valves within the disk 206 over a mechanically restricted angle of rotation of the disk sprocket. See FIG. 8. Each vacuum line is connected by a flexible large-diameter reinforced pipe (not shown) to the rear of each shell at 601. After exposure of the vacuum for a suitable period of time, then operation of the sealing bars and then the cutoff blade, the bag has become sealed and the chamber is returned to atmospheric pressure. The shell is lifted off the carrier. The computer 120 may use "sufficient time" as the criterion of evacuation, or may use input from an in-chamber pressure transducer (not shown) to show that sufficient vacuum had been established. In that case the computer 120 may vary the time at which the upper sealing bar is driven down, so that each chamber has had sufficient time for evacuation before sealing begins.

FIG. 3 is an underneath or interior view of one shell. The lifting arm is connected at 211. The trailing end is to the right and includes three actuator-driven parts. A single actuator 113 advances and retracts the pierce blade 406, visible in FIG. 4. The unsealed end of the bag becomes trapped between the clamp plate 405 and the clamp bar 304 when the shell drops. The series of points along the pierce blade then open the interior of the bag to allow evacuation. A group of two pneumatic actuators 114*a* and 114*b* driven in parallel advance and retract each end of the cutoff blade 301. The pair of larger actuators 115*a* and 115*b* that raise or lower each upper scaling bar by means of shafts passing through gas-tight gaskets in the top of the shell 112 are conveniently located outside the shell as shown in FIG. 6. It has been found that applying significant force to the bag where it is to be sealed results in better seals, by excluding foreign material. Some cuts of meat may include internal cavities, and may hold protein solutions such as tissue fluids, blood or serum which when exposed to a vacuum are inclined to produce foams likely to infiltrate between surfaces to be sealed. The preferred sealing force applied by both actuators (combined areas 10,053 $mm^2$) is about $4.5\times10^3$ Newtons for a 4.5 bar gas pressure. A pair of actuators provide added force and speed. These examples are type CQ2B40-30DZ double-acting actuators with 30 mm throw, supplied by SMC Pneumatics.com.

FIG. 4 is an oblique frontal view of the active parts inside one shell, showing the five actuators as three actuator sets, and the attached implements. An intra-shell support frame is 400. A support for the sealing bar actuators 115*a* and 115*b* is not shown. They are preferably mounted outside the shell because of their size. Please note that actuator 115*a* is drawn without a protective cover in FIGS. 2, 4 and 6. Each actuator has an 80 mm diameter piston with a 20 mm throw and the pistons are connected together at joints 115*c* and 115*d*. Both actuators push the lower contact surface 305 of upper sealing bar 303 against the top of heatable lower sealing bar 111. At the top of FIG. 6 the actuators 115*a* and 115*b* are shown in position for jointly forcing the upper scaling bar 303 through pivotal linkages against the lower sealing bar 111, with a neck of the bag to be sealed lying in between. Both sealing bars 111, 303 have heat-resistance pressure faces. The contact surfaces of the sealing bars are comprised of a low-friction, no-stick heat-resistant sheet material. A polytetrafluorethane (PTFE) composite surface is preferred.

The upper sealing bar is not internally heated in this embodiment, since power is more easily brought to the interior of the lower sealing bar 111 which is fixed to the carrier 110. In one embodiment, a sliding brush assembly uses two brushes extended from each carrier making sliding contact with two copper rails 104 underneath the path of the horizontally driven conveyor around a sector where sealing activity is expected. When in use, a computer-controlled impulse of a low-voltage, high-current supply of power is connected from a brush assembly (104*a* is identified) through a gas-tight seal to each end of the resistance wires inside lower sealing bar 111. Stainless steel wire is preferred. The signals/data bus 123 connected to the computer 120 includes a branch to cause the source 109 of heater power, on being addressed, to supply a controlled amount of power, as a controlled current for a controlled time starting at a particular moment. Conveyor speed, and the composition of the bag, for example, affect heating. For instance, heater power may be alternating current, easily controlled using solid-state switching semiconductors (TRIACS etc) within block 109. It may be useful to have the computer (through software) estimate the temperature of the stainless steel heating wires using its positive temperature coefficient of resistance and inferring resistance from applied voltage and current drawn.

FIG. 5 (from a photograph) shows details of a leading edge of one carrier from above and to one side. Conveyor 105 is driven by the sprocket teeth 205 on the disk sprocket and at this position it is guided by blocks of a low-friction plastics, at 502. The carrier includes a metal guide bar 501 (see FIG. 5) for receiving an end of the shell 112 as it is lowered on to a scalable perimeter 112*b* of the carrier. 405 indicates a clamp plate, against which a clamp bar 304 within the shell will press on to the open end of the bag (not shown) for restraining the edge of the open bag during evacuation. Bar 304A includes slots to admit the spikes of the pierce knife. Each carrier includes a fixed heatable lower sealing bar with a working surface 111, powered through wires 111*a* from a set of brushes (concealed).

FIG. 6 shows a front view of a leading end of a shell 112. Actuators 115*a* and 115*b* are placed outside the shell. The cutoff blade 403, driven by actuators 114*a* and 114*b*, is clearly visible. The piercing blade 406, driven by actuator 113 is also visible. The air outlet 601 leads from the shell through a wide flexible pipe and through the rotating vacuum valve to vacuum pumps.

In the embodiment described, compressed air at a pressure of for example 1-6 bar; preferably 4 to 5 bar is provided from the stationary part of the machine through an axial pipe inside hub 118 across a rotatable connection for use by the pneumatic actuators after distribution through a rotating set of solenoid-driven valves in housing 116. FIGS. 7, 8 and 9 show the housing 116 which contains an air-control block 902, 906 comprised of addressable process control modules as previously described in this section. Outlets to individual flexible pipes are shown at 903. Some support posts are shown at 701, 701*a*.

FIGS. 7 and 8 show the rotatable vacuum inlet valve for which the perforated disk 201 rotates with the array of shells over a fixed disk 202 which has been shaped to provide open sectors 802, 803 with apertures to the vacuum pump as shown in FIG. 8. Connections such as 204 are opened between a vacuum pump and the flexible, wide-bore vacuum pipe leading to each shell at inlet 601. Disk 202 includes a further sector 805 open to the atmosphere through a muffled, particle-filtered aperture in order to return the currently connected chamber to atmospheric pressure after sealing has been completed. Disk 202 also has an upward-facing peripheral scaling ring within a circumferential groove. Disk 203 serves as an air distributor, to use the vacuum inside a processed chamber to partly evacuate a newly formed chamber. Disks 202 and 203 are stationary, while disk 201 and parts 166 and 701 turn with the motion of the disk sprocket.

FIG. 8 shows further details of the fixed valves for connecting the vacuum pump to the shell to be evacuated. The angular position of the shell around the hub 118 sets the timing of evacuation. Fine control of the evacuation onset and duration is not useful; it is simply maximised.

Digital Computer and Sequencing

This Rotary Vacuum Packing Machine is rendered programmable with an included digital computer 120 as shown in FIG. 1, plus related devices 121 (console), 122 (memory) and 124 (bag data interface). It may be a stand-alone computer running application-specific software under an operating system such as Linux or Windows or a functional equivalent, or be programmed in an assembler language, or it may comprise a programmable logic array. It may be part of a computer network (not shown) of the industrial site. The embodiment described used an Allen-Bradley 5069-L320ERM CompactLogix 5380 controller and software within block 120. Such devices are adapted for use in industrial environments. A console 121 presents an operator with a display of the current status of the process and allows entry of altered parameters and to start or stop the machine. In particular, some processes can be amended while the disk sprocket is turning, so that individual, adjacent bags may be treated differently. If different bags to be packed arrive unsorted yet are described by individual accompanying data, the computer 120 may use a different set of pre-loaded parameters for processing each one. A sequence used in one shell does not affect the sequence used in any other shell. Preferably, amendments may be made without active contribution by the operator.

For the present embodiment having a processor and a rotatable electric coupling 117, uniquely addressable solenoid-driven valves and pneumatic actuators, most events may be independently controlled, and may be set accurately given an about 10 ms (millisecond) actuator response time which is useful in the context of a 4 second duration process. See FIGS. 10 and 11. An example address for a particular pneumatic valve includes “A-5-2-1” where A is the machine (assuming more than one, such as A, B and C exist), ‘5’ is the particular shell, ‘2’ is the particular actuator group (such as the upper heating bar set), and ‘1’ means “extend the actuator”, whereas ‘0’ means “retract the actuator”.

The computer 120 is empowered through its control software to receive an incoming message carrying a time when the disk sprocket reaches an arbitrary start point which may be one point per shell, compatible with a mechanical, optical or magnetic device and an appropriate sensor. Then the computer 120 may use an internal clock to advance through the steps of a vacuum packing operation, including the steps of perforation, evacuation, sealing and cutting surplus material off before the chamber receives admitted air and the shell is lifted off the carrier. Some parameters may be shown on the console as degrees of rotation from an arbitrary start point. Instead of a clock, motor control steps or other indications of turntable rotation may be used. Variables typically include values previously established as suitable for particular operating conditions such as the composition of a bag (a particular thermoplastics film as one or more layers, or inclusion of a foam layer on one side), the volume of the bag, the contents of the bag, and may include the conveyor speed in effect at the time that the parameters were established.

Parameters include actuator timing, sealing conditions such as heating power, and the speed of the conveyor.

Preloaded parameter sets can be treated as default values to be used as stored, or be first modified by the computer or by the operator before use, in light of further information. The computer 120 preferably includes a store 122 of any number of sets of parameters, perhaps held in a read-only memory or in a non-volatile flash memory. The computer 120 may create new sets autonomously or as a result of instructions entered by the operator, or it apply instructions on a "one-time" basis only.

Data received from post-scaling reports may be used to amend stored parameters. But it will be appreciated that bag sealing effectiveness may not be fully confirmed until samples of sealed bags have been stored for weeks. The computer 120 may generate reports from stored data in which every identified bag and the parameters used to seal that bag are included, so that failures of any type can be tied to particular bag and film types and settings that were used, for improving future performance.

Optionally, the computer receives real-time inputs such as pressure information from a transducer to confirm establishment of a sealed chamber or to confirm a suitable evacuation pressure. But vacuum sensing may be difficult if the shell interior becomes contaminated. Other sensors included in the machine return data to inform the computer 120 about the process, such as sealing temperature, valve and actuator movements, and to indicate any problems.

It will be appreciated that use of groups of digitally controlled pneumatic actuators having control valves that are separately addressable within any specified shell by computer 120 allows actions inside any one chamber to occur simultaneously, in a sequence without delays, or to have overlapping actions. The programmable machine allows steps in any one shell process to be telescoped together and overlaid as far as possible, even while changes are being made in real time, thereby leaving more time for evacuation of the bag at a fixed conveyor speed; alternatively to allow a faster conveyor speed. The total available processing time per shell is about 3 to 4 seconds. Mechanically controlled events such as lowering and raising shell movements, and vacuum valve opening and closing are not controlled by actuators.

FIG. 10 is a graph comparing cam-based and electric timing of pre-pierce actuator activation. The horizontal axis is time in ms; zero time represents creation of a chamber. The mechanically operated valve was fitted to a prototyping machine. The vertical axis is actuation pressure in millibars. The pierce blade actuator 113 is activated as soon as the chamber is created by dropping the shell on to the carrier or base, trapping the open end of the bag between the clamp plate 405 and the clamp bar 304. A set of punctures is made in the bag by piercing knife 406 between the clamped open end and an intended sealing zone.

Evacuation of the chamber is shown by curve 1000. This graph compares activation of actuator 113 driving the pierce blade 406 by either a cam-triggered mechanical valve staying open for 300 ms as curve 1001, or an electrically driven valve as curve 1002 staying open for 100-120 ms. (Actuator 113 is powered by about 4.5 bar of air pressure.) If the pierce blade is extended for longer, it will obstruct evacuation of the bag and limit the total available process time. That allows a 200 ms longer evacuation time over approximately 3 to 4 seconds. With the amount of control provided in this invention, the process could be designed to better perforate a thick or multi-layer bag by repeatedly extending the pierce blade.

FIG. 11 is a graph showing that cutoff knife operation, (curve 1101) by actuators 114*a* and 114*b* at 3500 ms for a duration of 220 ms can closely follow upper seal bar extension at 3200 ms (curve 1100), driven by actuators 115*a* and 115*b* following bag evacuation. This graph has time on the horizontal axis as ms, and pressure as supplied to the respective actuators on the vertical axis, in millibars.

The sealing bar actuators are controlled as shown in FIG. 11 as follows: Seal bar extension "as late as possible" starts at 3200 ms. The duration of the upper seal bar extension (not shown in FIG. 11) during which time the heat-sealing operation occurs "as long as possible" and is set by knowledge of the rate of heating of the bag between the seal bars during a pulse, modified by a variable derived from the conveyor running speed. Also, the bag material must be allowed to cool sufficiently before the seal bar is lifted away. For this example, the seal bar will be retracted at 5420 ms at which point the now dissipating vacuum level is about 85% of atmospheric pressure. The shell 112 will be pushed off the base 110 by actuator 115 pressure through the sealed bag; possible once the chamber is returned to about 85% of atmospheric pressure. The shell is then lifted clear by the cam follower pushed by cam assembly 212 against bearing 210 (FIG. 2).

Computer 120 may also receive process inputs. For example, as shown in FIG. 1, a detector 124 of incoming bags may allow the computer to recognize a particular type of incoming bag, also including the nature of the contents if relevant, and pluck a most appropriate set of parameters from its store 122 in order to best perform the sealing process. Computer 120 may select sets of parameters in accordance with knowledge of a sequence of one or more types of bag that had already been established earlier, or upstream, along the production line. The detector 124 may for example be a machine-vision system including a camera and image recognition apparatus; it may be a bar-code or QR code reader, or a camera that can read text indicia that have been printed onto the bag. It may include a bag weight sensor. The data may have been generated at preceding work stations and carried within a factory network.

The computer 120 communicates with the motor 106, the heater power control 109 and the rotating set of solenoid valves inside the housing 116 through a signals/data bus 123, preferably one using EtherNet/IP protocol signals as packets. One sensing input is used to indicate the current rotational position of the shell in order to define the start of any sequence.

Excess bag material including perforations made by the pierce blade beyond the seal is removed. Before the sealing bars are released, the cutoff blade 301 driven by actuators 114*a* and 114*b* is advanced through the now sealed plastic bag along a line close to the preceding edge of bar 303 as shown in FIG. 4. Preferably, the cutoff blade is extended about 300 ms after the seal bar has come down, and the actuators remain extended for about 100 ms (see FIG. 11). Cutoff could be delayed until after the heater power has stopped.

The sealing portion of the sequence of events will be applied after sufficient exposure to the vacuum, subject to an overall limit of time. In this embodiment that limit is simply assumed since the vacuum duration depends on a rotary valve. In a development, the vacuum inside the shell could be monitored. The motor 106 could be slowed so that each shell, when at an appropriate phase of the process, is able to reach a required vacuum which is less than 5 mbar and more preferably around 1 mbar in order to create a sealed bag with a sufficiently long shelf life.

The whole sequence may take 3 to 6 seconds. The example sequence in Table 1 has a duration of 5600 ms. (The curves shown in FIGS. 10 and 11 are from a different trial).

TABLE 1

| Step | Description | Example Duration |
|---|---|---|
| 2 | An absolute encoder, located on the disk sprocket, passes a sensor and starts the timing sequence. | T = 0 ms |
| 1 | A cam follower is moved down by a cam fixed in place beneath the disk. A shaft moves down, causing the adjacent shell to be lowered on to the already loaded carrier, and pressed against a gasket. The open end of the bag is caught between a clamp plate fixed on the carrier, and a clamp bar, held inside the shell. | T = −100 |
| 3 | A pierce knife inside the shell is pushed downward by an actuator. Multiple spikes penetrate the bag between the clamped end and the site of sealing. Punctures allow air to escape. (FIG. 10) | T = −30 |
| 4. | Evacuation of the chamber begins, pressing the shell gasket against the carrier by air pressure. In this embodiment, a vacuum is maintained for a more than adequate time. Curve 1000 in FIG. 10 is a part of the vacuum record. | T = 0 |
| 5. | The actuator for the pre-pierce knife is deactivated. See 1002 in FIG. 10 (1001 compares a mechanically operated valve activation) | T + 100 |
| 6. | After waiting an arbitrary time for evacuation to occur, the upper seal bar is lowered (actuator pressure curve is 1100 in FIG. 11) and pushed against the lower seal bar by two actuators. That takes about 50 ms. (FIG. 11) | T + 3200 |
| 7. | Pass a heating current through the lower seal bar, carried to the moving carrier by brushes. Duration and amount are controlled. (600 ms typically.) | T + 3400 |
| 8. | End of the heating current. | T + 4000 |
| 9. | The cutoff blade is pushed downward by actuators. Actuator pressure curve is 1101 in FIG. 11 | T + 3600 |
| 10 | The cutoff blade is pulled up. | T + 3900 |
| 11. | The upper seal bar is lifted | T + 5650 |
| 12. | The vacuum is terminated; the chamber returns toward atmospheric pressure. | T + 5280 |
| 13. | The shell is lifted. The sealed bag proceeds upon the platen to an outflow region. The material removed by the cutoff blade is disposed of. | T + 5425 |

Example Settings

In this version, 0° is the moment at which an index marker for a particular shell and carrier combination is traversed by the rotating disk sprocket. It is always desirable to actively retract the top seal bar before chamber pressure=85% of atmosphere, otherwise the shell may be lifted off by the seal bar actuators.

| | | |
|---|---|---|
| Pre-pierce knife; start angle | 5° | |
| Pre-pierce; active time | 100 ms | (50-100-200) |
| Top seal bar extends | 95° | (70-97-105) |
| Lowering time | 150 ms | (50-100-150) |

Power application is to follow the completion of lowering time,

| | |
|---|---|
| Lifting time Offset | 0 ms (−100-0 + 100 high = long dwell but chamber may pop up |
| Cut-off Knife; Start time offset | 200 ms (100-200-1500) |

-continued

| | |
|---|---|
| Active Time | 100 ms (50-100-200; or 0 = 'disable') |

VARIATIONS

Options for carrying signals such as time-critical digital addresses past a rotary joint include a rotary transformer, slip rings or electromagnetic, radio or optically transmitted signals.

Optionally, an air compressor (not shown) powered from the power supply fed by the slip rings may be located on or near the housing 116 to supply the solenoid-driven air valves at typically 4 to 6 bar pressure. That would overcome a need to supply air over a rotating joint.

The vacuum may be applied to each shell 112 through a solenoid-controlled valve connected to the vacuum pump inlet, and the shells may be lifted and powered by an electric or pneumatic actuator; as determined by the digital computer 120. Independence reduces reliance on physical motion of the disk sprocket and may allow an extended evacuation time.

Each upper sealing bar could be heated under digital computer 120 control using power storage devices such as a supercapacitor previously charged up over a time during rotation and connected to the currently active chamber for a limited time through a solid-state switch. Storage is used to avoid exceeding current ratings of the slip rings. That may allow reduction of the time allocated to heat sealing.

A single digital computer 120 may be used in charge of several separate rotary vacuum packing machines. Banks of for example two or three adjacent machines are used in simultaneous operation in an industrial installation. That provides a single operator interface for managing the bank of machines.

Advantages

The invention describes a way to transfer commands from a fixed source (the computer 120) to control the actuators within the rotating shells. The onset and duration of most actions are controlled by a programme which accepts real-time modifications according to the particular bag characteristics.

Use of specific actuators provided with compressed air to control the sequence inside each shell, using electric signals to operate individually addressable solenoid-controlled valves under control of a digital computer or an equivalent allows actions to be performed precisely inside any chamber at any required time. Many actions can be performed in a closely following or even superimposed sequence.

For example fine control of the temperature and time of heat sealing, to the nearest 10 ms (milliseconds) allows optimal sealing for a given kind of plastics material. Within limits, actuator actions are independent of running speed.

The sequence inside any shell may be varied according to previously established knowledge about the incoming bag to be evacuated and sealed and its contents, while the machine is in operation, so there is no loss of throughput as there would have been if the machine had to be stopped and cam followers or the like were mechanically adjusted. Changes from one bag to the next bag may be made if the bag contents vary.

Settings can be varied by a suitably trained operator or automatically based on incoming bag characteristics.

Using a digital computer as the controller allows a large range of combinations of sealing settings to be stored. Then, alteration can be done by selecting one of a number of sets of predetermined parameters manually or automatically, in response to a change in the plastics material used in bagging (including foam backing) or by dimensions, or type of the material being packed. Such variables may be detected by transducers.

Although the concept could create over a hundred individual control solenoid addresses, use of a digital computer at both ends of a transmission route including a rotary joint allows elimination of addressing errors by computational means, for example error-detecting codes similar to Hamming codes, thereby overcoming effects of electrical disturbances.

A record of the parameters used, at even a bag-by-bag level, may be kept for quality control. It is now common to maintain individual bag records of meat products up to the Point of Sale.

In conclusion, we remind the reader that the description given above is for but one embodiment of the principles of the invention.

I claim:

1. A rotary vacuum packing machine comprising:

a plurality of vertically openable and closable shells disposed as a radial array upon a rotatable turntable having a hub that rotates, when in use, about an axle;

each shell is capable of forming a sealed chamber for evacuation and sealing when lowered onto an article carrier mounted on a conveyor and carried around the rotatable turntable while holding an unsealed, bagged article for vacuum packing;

each shell including groups of one or more actuators;

each group of the one or more actuators having a function selected from holding, perforating, cutting, and sealing;

wherein each group of the one or more actuators is controlled by separately addressable, electrically operated pneumatic valves mounted upon the hub and configured to receive a real-time control signal from a digital computer via a communications network, enabling per-shell, per-bag customization of timing and sequence of the one or more actuators during uninterrupted machine operation;

wherein the digital computer dynamically adjusts actuator timing and sequence in real time based on bag-specific parameters including at least one of bag type, bag contents, or bag size; and wherein each shell can independently carry out steps at individually selected times while the rotatable turntable is in uninterrupted rotation.

2. The rotary vacuum packing machine as claimed in claim 1, wherein the rotatable turntable is provided adjacent to the hub with an apparatus for providing a rotatable connection between a fixed axis and the hub of the turntable to electrical energy and to the communications network, wherein the apparatus is selected from a range including slip rings and a rotary transformer and to provide power delivery to the separately addressable, electrically operated pneumatic valves.

3. The rotary vacuum packing machine as claimed in claim 2, wherein the rotary vacuum packing machine also includes an indexing transducer at a network address and responsive to an article carrier in proximity, wherein the indexing transducer provides bag-specific data to the digital computer for individualized process control.

4. The rotary vacuum packing machine as claimed in claim 1, wherein the groups of the one or more actuators are bidirectional; the groups of the one or more actuators being connected through a flexible pipe to an addressed valve capable in use of supplying compressed air at either an extension connector or at a retraction connector, and wherein a timing of actuation is determined dynamically based on bag-specific parameters.

5. The rotary vacuum packing machine as claimed in claim 1, wherein a resistive heater in a lower sealing bar within an article carrier is heated with a controlled current collected by conductive brushes from fixed electrical conductor rails disposed in a zone below the rotatable turntable, wherein the digital computer controls the timing and an amount of current in the fixed electrical conductor rails according to a type of thermoplastics material to be fused and controls a speed of the conveyor.

6. The rotary vacuum packing machine as claimed in claim 2, wherein the digital computer stores at least one table of information; each table of information comprising a value previously established as suitable for evacuating and sealing a bag having a thermoplastics film and an optional foam layer and taking account of a contents of the bag, a size of the bag, a required temperature and a time for sealing the bag, and a speed of the conveyor, and wherein the digital computer selects or modifies the at least one table of information in real time based on incoming bag data.

7. The rotary vacuum packing machine as claimed in claim 6, wherein the digital computer, when in use, is capable of receiving descriptive inputs about each incoming item to be packed originating from a range including without limit a human operator, a computer network, an upstream process, a machine-vision system used to inspect bags at an in-feed location, and a reader capable of reading indicia previously printed on to each bag, and wherein the computer may amend a copy of the table of information appropriate for a particular operating condition and apply an amended information to the valves connected with an identified shell to enable per-bag process customization.

8. The rotary vacuum packing machine as claimed in claim 6, wherein the digital computer also displays data about a process upon the rotatable turntable to an operator at a console, and is responsive to operator commands thereby allowing at least some process parameters to be amended while the rotary vacuum packing machine is in uninterrupted operation, including during active rotation of the rotatable turntable.

9. The rotary vacuum packing machine as claimed in claim 6, wherein one digital computer manages more than one rotary vacuum packing machine through a shared communications network, and applies individualized control to each shell across a group of packaging machines.

10. The rotary vacuum packing machine as claimed in claim 2, wherein each hub carries related electrical equipment that includes network-compatible address decoding circuits, solenoid driver circuits, and a local power supply or conditioner.

* * * * *